United States Patent

Clark, III

[11] 4,148,951
[45] Apr. 10, 1979

[54] IMAGE RETENTION ON TOPICAL THERMOGRAPH

[76] Inventor: William T. Clark, III, Number Six Davis Blvd., New Orleans, La. 70121

[21] Appl. No.: 905,935

[22] Filed: May 15, 1978

[51] Int. Cl.² .................... C09K 3/34; G01K 11/12; A61B 5/00
[52] U.S. Cl. .................... 428/1; 128/2 H; 73/356; 350/338; 350/351
[58] Field of Search .............. 428/1; 350/351, 338; 128/2 H; 73/356

[56] References Cited

U.S. PATENT DOCUMENTS

| | | | |
|---|---|---|---|
| 3,114,836 | 12/1963 | Fergason et al. | 350/351 |
| 3,802,945 | 4/1974 | James | 350/351 |
| 3,893,340 | 7/1975 | Parker | 73/356 |
| 3,993,809 | 11/1976 | Schranz et al. | 428/1 |
| 4,025,688 | 5/1977 | Nagy et al. | 428/350 |
| 4,060,654 | 11/1977 | Quenneville | 428/1 |
| 4,064,872 | 12/1977 | Caplan | 350/351 |

Primary Examiner—William R. Dixon, Jr.
Attorney, Agent, or Firm—Littlepage, Quaintance, Murphy, Richardson and Webner

[57] ABSTRACT

Heat storage means are provided for reducing heat loss from a liquid crystal thermographic sheet, which normally has good heat transmission characteristics in order to respond readily to temperature variations along a body surface against which the sheet is pressed. The heat storage means include a sheet or layer of material having relatively poor thermal conductivity disposed adjacent to the thermographic sheet. One or more reflective sheets or layers may be used for reflecting the thermal image back into the layer of poor thermal conductivity.

7 Claims, 5 Drawing Figures

IMAGE RETENTION ON TOPICAL THERMOGRAPH

FIELD OF THE INVENTION

Stock material or miscellaneous articles, Liquid Crystal.

PRIOR ART

Furgason et al U.S. Pat. Nos. 3,114,836; Schranz et al 3,993,809; and Nagy et al 4,025,688.

BACKGROUND OF THE INVENTION

Topical thermography, wherein micro-encapsulated liquid crystals are used for medical diagnostic purposes, has been severely inhibited because of poor persistence of the thermal image created in the liquid crystals. When a conventional liquid crystal sheet is applied to a body surface, the display of color resulting from the variations in temperature along the body surface must be observed or photographed promptly then and there, because once the sheet is removed from the body surface, the heat loss from the liquid crystals causes the colors to change and produce a false reading. Not only does this impose undesired requirements for camera set-ups and for undue haste where deliberation may be called for, but it makes it virtually impossible to use topical thermography for observing temperature variations along surfaces of body cavities.

OBJECTS

The object of this invention is to provide means for retaining thermal images in liquid crystal sheets so that the color variations produced therein may be observed for a significant length of time after the sheet is removed from the body surface whose temperature is being measured.

A further object is to intensify the thermal image on a liquid crystal sheet so that the contrast in color resulting from thermal differences between adjacent areas will be more vivid and, therefore, more readable.

These and other objects will be apparent from the following specification and drawing, in which FIG. 1 is an edge view of a topical thermographic assembly;

Figure 1:
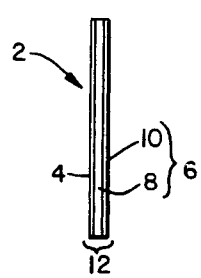
Figure 2:
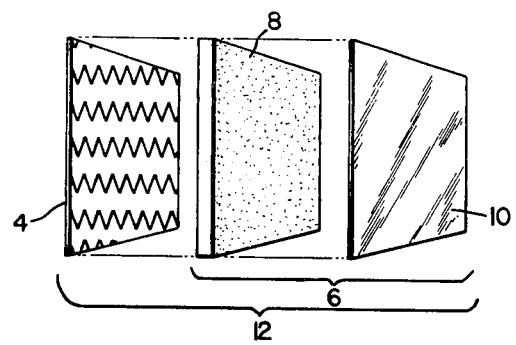
FIG. 2 is an exploded view of the assembly shown in FIG. 1.

Referring now to the drawings, in which like reference numerals denote similar elements, the topical thermographic assembly 2 shown in FIGS. 1 and 2 is composed of a thermographic film sheet 4 containing or having thereon temperature-sensitive liquid crystals. Such sheets are well known in the art, and they are usually made of a relatively thin plastic substrate, to obtain the maximum thermal conductivity between the liquid crystals and the body surface against which they are pressed. In conjunction with the thermographic film 4, there is provided a storage screen 6 which consists of a flexible sheet 8 of low thermal conductivity which may be, for example, a sheet of acrylic ploymer or other substance of low thermal conductivity. Other examples of storage media include polystyrene, polycarbonate, polyethylene, cellulose acetate and, if flexibility is not important, glass. The sheet 8, being flat, is adapted to have one side and surface engagement with the sheet 4. On the other side of sheet 8 is a mirror 10. This may simply be a reflective surface on sheet 8 or a sheet having a mirrored surface veneered to the flat side of sheet 8 opposite the side which engages against the thermographic film 4. This matrix 12 is presented to a body surface and exposed. The thermal image then persists because the mirror 10 reflects the thermal image back into the liquid crystals 1 and prevents radiation loss. A mirrored acrylic sheet ⅛ inch thick, for example, will retain a usable image for at least 30 seconds at room temperature.

Figure 3:
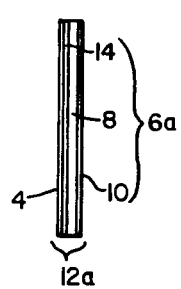
FIG. 3 is an edge view of a modified form of the topical thermographic assembly.
Figure 4:
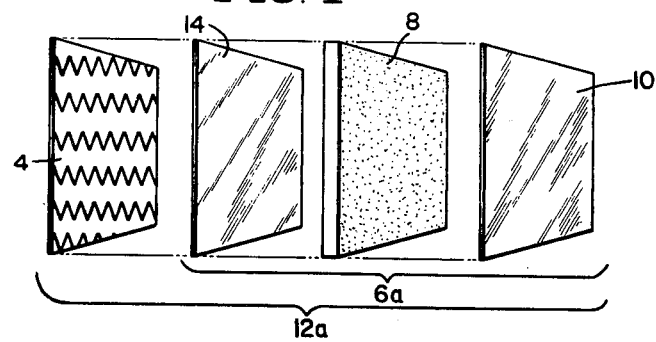
FIG. 4 is an exploded view of the assembly shown in FIG. 3.
Figure 5:
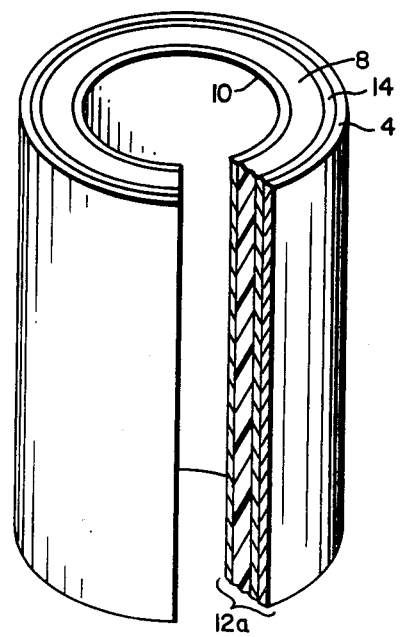
FIG. 5 is an elevation, broken away to show the assembly in cross section of the FIG. 4 assembly which has been bent to cylindrical form for insertion into a body cavity.

A thinner storage screen 6a is shown in FIGS. 3, 4 and 5. These, together with the thermographic film sheet 4 from the topical thermographic assembly 12a. The storage screen 6a differs from screen 6 in that a second mirror 14, which is semi-transparent, semi-reflective, is interposed between the sheet 8 of low thermal conductivity and the thermographic film sheet 4. The two mirrors 10 and 14 isolate the thermal image between them and inhibit thermal radiation in either direction from sheet 8. The use of two mirrors remarkably increases image persistence and allows a reduction in the thickness of the storage medium. A two-mirror matrix as described with the combined thickness of only 1/32 of an inch will retain a thermal image for at least one minute at room temperature.

The mirror or mirrors in the storage screen serve a dual function. They prevent radiation loss, and they retroreflect the thermal image, which inhibits lateral degradation and subsequent loss of image resolution.

The storage screen may be fabricated in many shapes. A tubular storage screen is illustrated in FIG. 5. This is the assembly 12a shown in FIGS. 3 and 4. Such a screen is useful for introduction into body cavities. A flexible storage screen may be curved for introduction into the cavity and then flattened for easy photography upon removal. The liquid crystal sheet may be permanently adhered to the storage screen, or it may be removable; the storage matrix can then be contacted with the body separately and then rejoined with the liquid crystal sheet for viewing. Detachability of the elements of the storage screen allow for easy cleaning.

The storage screen can also be used to increase image contrast. Higher body temperatures expose the storage screen more rapidly. Variation of exposure time will therefore determine what thermal details are stored. Areas of elevated temperature can then be displayed more prominently and distinctly. Such increased contrast often greatly aids diagnosis.

I claim:

1. A topical thermographic assembly comprising:
   a first layer containing temperature-sensitive liquid crystals, and
   a storage screen comprised of
   a second layer of relatively low thermal conductivity with respect to the frist layer and adapted for face contact on one side thereof with the first layer and mirror means on
   the other side of the second layer for reflecting a thermal image back through the second layer onto the temperature-sensitive liquid crystals in the first layer.

2. A topical thermographic assembly as defined in claim 1, said storage screen being further comprised of partly-reflective, partly-transparent mirror means on said one side of said second layer for cooperating with the first mirror means for oscillating a thermal image back and forth through the second layer and for inhibiting radiation loss from the assembly.

3. A topical thermographic assembly as defined in claim 1, said first and second layers being comprised of flat sheets of flexible plastic material.

4. A topical thermographic assembly as claimed in claim 3, said flat sheets being joined in face-to-face contact with one another.

5. A topical thermographic assembly as claimed in claim 2, said first and second layers being comprised of flat sheets of material and the partly-reflective, partly-transparent mirror means being sandwiched between them.

6. A storage screen for a liquid crystal thermographic film comprising:
- a flat sheet of material adapted for face contact on one side thereof with a liquid crystal thermographic film and being characterized by relatively low thermal conductivity as compared to the film, and
- mirror means on the other side of said sheet for reflecting a thermal image back through said sheet towards the film.

7. A storage screen as defined in claim 6, and
- semi-transparent, semi-reflective mirror means on said one side of said sheet for cooperating with the first-mentioned mirror means to oscillate a thermal image back and forth through said sheet.

* * * * *